US012809466B2

(12) United States Patent
Ko et al.

(10) Patent No.: US 12,809,466 B2
(45) Date of Patent: Nov. 24, 2026

(54) TACTILE FEEDBACK SYSTEM AND METHOD FOR GENERATING TACTILE FEEDBACK

(71) Applicant: Industrial Technology Research Institute, Hsinchu (TW)

(72) Inventors: Hung-Hsien Ko, Hsinchu County (TW); Heng-Yin Chen, Hsinchu County (TW); Yun-Yi Huang, Pingtung County (TW); Wan-Hsin Hsieh, Taoyuan City (TW)

(73) Assignee: Industrial Technology Research Institute, Hsinchu (TW)

( * ) Notice: Subject to any disclaimer, the term of this patent is extended or adjusted under 35 U.S.C. 154(b) by 207 days.

(21) Appl. No.: 18/792,587

(22) Filed: Aug. 2, 2024

(65) Prior Publication Data

US 2025/0068247 A1 Feb. 27, 2025

Related U.S. Application Data

(60) Provisional application No. 63/534,355, filed on Aug. 24, 2023.

(30) Foreign Application Priority Data

Mar. 19, 2024 (TW) ................................ 113110061

(51) Int. Cl.
*G06F 3/01* (2006.01)

(52) U.S. Cl.
CPC ............. *G06F 3/016* (2013.01); *G06F 3/011* (2013.01)

(58) Field of Classification Search
CPC ................................ G06F 3/016; G06F 3/011
See application file for complete search history.

(56) References Cited

U.S. PATENT DOCUMENTS

| | | | | |
|---|---|---|---|---|
| 5,719,561 A * | 2/1998 | Gonzales | ................. | G08B 6/00 340/407.1 |
| 9,280,206 B2 | 3/2016 | Nagar et al. | | |

(Continued)

FOREIGN PATENT DOCUMENTS

| | | |
|---|---|---|
| CN | 115937633 | 4/2023 |
| TW | 201626121 | 7/2016 |

(Continued)

OTHER PUBLICATIONS

Yusuke Ujitoko et al., "Survey of Pseudo-Haptics: Haptic Feedback Design and Application Proposals", IEEE Transactions on Haptics , vol. 14, No. 4, May 5, 2021, pp. 699-711.

(Continued)

*Primary Examiner* — Daniel W Parcher
(74) *Attorney, Agent, or Firm* — JCIPRNET

(57) ABSTRACT

A tactile feedback system and a method for generating a tactile feedback are provided. The method includes: obtaining, by a tactile feature classification module, a fused tactile signal using 2D image digital data, 3D topography data, and a tactile representative signal corresponding to an object; obtaining, by a tactile signal conversion module, an object surface coordinate from an object surface coordinate processing module, obtaining, by the tactile signal conversion module, a tactile fusion result using the fused tactile signal and the object surface coordinate, and converting, by the tactile signal conversion module, the tactile fusion result into a tactile digital code; and generating, by a tactile feedback actuation module, the tactile feedback using a tactile control signal corresponding to the tactile digital code.

17 Claims, 15 Drawing Sheets

(56) References Cited

U.S. PATENT DOCUMENTS

| | | | | |
|---|---|---|---|---|
| 10,209,775 | B2 | 2/2019 | Keller et al. | |
| 10,748,391 | B2 | 8/2020 | Grant et al. | |
| 10,860,103 | B2 | 12/2020 | Kacelenga | |
| 10,976,826 | B1 | 4/2021 | Keller et al. | |
| 11,287,889 | B2 | 3/2022 | Cruz-Hernandez et al. | |
| 2007/0097151 | A1* | 5/2007 | Rosenberg | G06F 1/169 345/660 |
| 2008/0303782 | A1 | 12/2008 | Grant et al. | |
| 2012/0327006 | A1* | 12/2012 | Israr | G06F 3/0443 345/173 |
| 2015/0293592 | A1* | 10/2015 | Cheong | G06F 1/163 345/173 |
| 2017/0108930 | A1* | 4/2017 | Banerjee | A61B 34/72 |
| 2021/0117002 | A1* | 4/2021 | Eagleman | G06F 3/011 |
| 2021/0318755 | A1* | 10/2021 | Trotta | G06F 3/017 |
| 2023/0067456 | A1* | 3/2023 | Lee | G02B 27/0093 |
| 2024/0127917 | A1* | 4/2024 | Tietjen | G16H 50/70 |
| 2024/0153205 | A1* | 5/2024 | Huergo Wagner | G06F 1/163 |
| 2024/0169491 | A1* | 5/2024 | Thayyullathil | G06T 5/70 |
| 2025/0221782 | A1* | 7/2025 | Dozeman | A61B 17/14 |

FOREIGN PATENT DOCUMENTS

| | | | |
|---|---|---|---|
| TW | 201629762 | 8/2016 | |
| TW | 201901368 | 1/2019 | |
| WO | WO-2024173940 A1 * | 8/2024 | A61F 9/00825 |

OTHER PUBLICATIONS

“Office Action of Taiwan Counterpart Application”, issued on Feb. 25, 2026, p. 1-p. 9.

* cited by examiner

TACTILE FEEDBACK SYSTEM AND METHOD FOR GENERATING TACTILE FEEDBACK

CROSS-REFERENCE TO RELATED APPLICATION

This application claims the priority benefit of U.S. provisional application Ser. No. 63/534,355, filed on Aug. 24, 2023 and Taiwan application serial no. 113110061, filed on Mar. 19, 2024. The entirety of each of the above-mentioned patent applications is hereby incorporated by reference herein and made a part of this specification.

TECHNICAL FIELD

The disclosure relates to a tactile feedback system and a method for generating a tactile feedback.

BACKGROUND

Currently, virtual reality (VR) and extended reality (XR) applications usually only include visual feedback, and there is no effective tactile feedback technology.

SUMMARY

A tactile feedback system and a method for generating a tactile feedback are introduced herein.

A tactile feedback system according to an embodiment of the disclosure includes a tactile feedback control subsystem and a feedback actuation subsystem. The tactile feedback control subsystem includes a tactile feature classification module, a tactile signal database, an object surface coordinate processing module, and a tactile signal conversion module. The tactile signal database stores a tactile representative signal. The feedback actuation subsystem includes a tactile feedback actuation module. The tactile feature classification module obtains a fused tactile signal using 2D image digital data, 3D topography data, and the tactile representative signal corresponding to an object. The tactile signal conversion module obtains an object surface coordinate from the object surface coordinate processing module, the tactile signal conversion module obtains a tactile fusion result using the fused tactile signal and the object surface coordinate, and the tactile signal conversion module converts the tactile fusion result into a tactile digital code. The tactile feedback actuation module generates a tactile feedback using a tactile control signal corresponding to the tactile digital code.

A method for generating a tactile feedback according to an embodiment of the disclosure includes the following steps. A fused tactile signal is obtained by a tactile feature classification module using 2D image digital data, 3D topography data, and a tactile representative signal corresponding to an object. An object surface coordinate is obtained by a tactile signal conversion module from an object surface coordinate processing module, a tactile fusion result is obtained by the tactile signal conversion module using the fused tactile signal and the object surface coordinate, and a tactile fusion result is converted into a tactile digital code by the tactile signal conversion module. The tactile feedback is generated by the tactile feedback actuation module using a tactile control signal corresponding to the tactile digital code.

Several exemplary embodiments accompanied with figures are described in detail below to further describe the disclosure in details.

BRIEF DESCRIPTION OF THE DRAWINGS

The accompanying drawings are included to provide a further understanding, and are incorporated in and constitute a part of this specification. The drawings illustrate exemplary embodiments and, together with the description, serve to explain the principles of the disclosure.

DETAILED DESCRIPTION OF DISCLOSURED EMBODIMENTS

Figure 1:
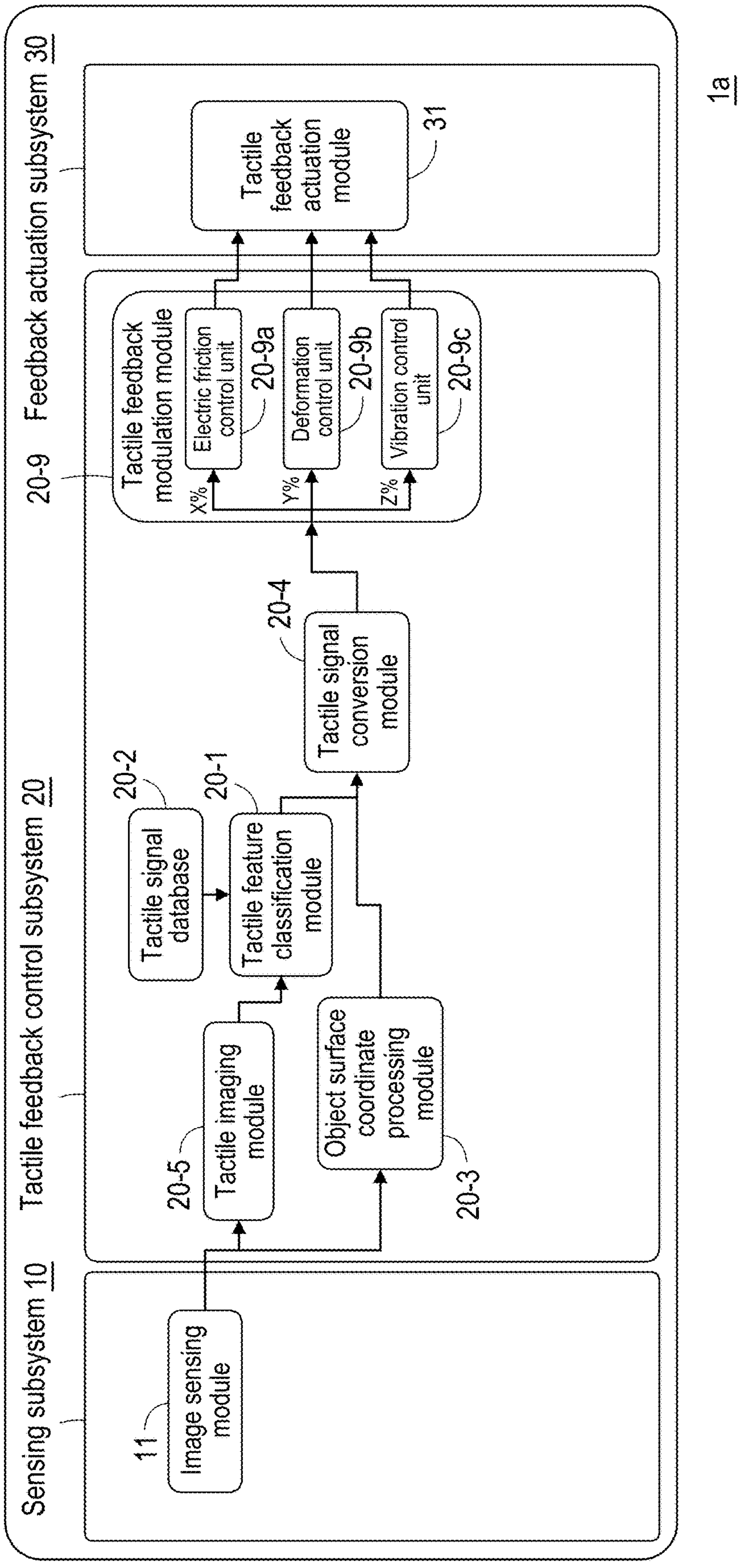
FIG. 1 is a schematic diagram of a tactile feedback system according to an embodiment of the disclosure.

FIG. 1 is a schematic diagram of a tactile feedback system 1*a* according to an embodiment of the disclosure. In the embodiment, a tactile feedback system 1*a* may include a tactile feedback control subsystem 20 and a feedback actuation subsystem 30. In other embodiments, the tactile feedback system 1*a* of the embodiment of the disclosure may further include a sensing subsystem 10. In the embodiment, the tactile feedback control subsystem 20 may include a tactile feature classification module 20-1, a tactile signal database 20-2, an object surface coordinate processing module 20-3, and a tactile signal conversion module 20-4, wherein the tactile signal database 20-2 may store a tactile representative signal. For example, the tactile representative signal is, for example, a parameter such as an object surface roughness, a surface texture feature, a friction coefficient, an object density, an object hardness, and an object elasticity coefficient. In the embodiment, the feedback actuation subsystem 30 may include a tactile feedback actuation module 31. In other embodiments, the sensing subsystem 10 may include an image sensing module 11, and the tactile feedback control subsystem 20 may further include a tactile imaging module 20-5. The image sensing module 11 is, for example, a 2D camera or a 3D camera. It should be noted here that the sensing subsystem 10, the tactile feedback control subsystem 20, and the feedback actuation subsystem 30 of various embodiments of the disclosure may be software and/or firmware codes executed by a processor. In another embodiment, the sensing subsystem 10, the tactile feedback control subsystem 20, and the feedback actuation subsystem 30 of various embodiments of the disclosure may be implemented as circuits. The disclosure does not limit the implementation methods of the sensing subsystem 10, the tactile feedback control subsystem 20, and the feedback actuation subsystem 30.

Figure 2:
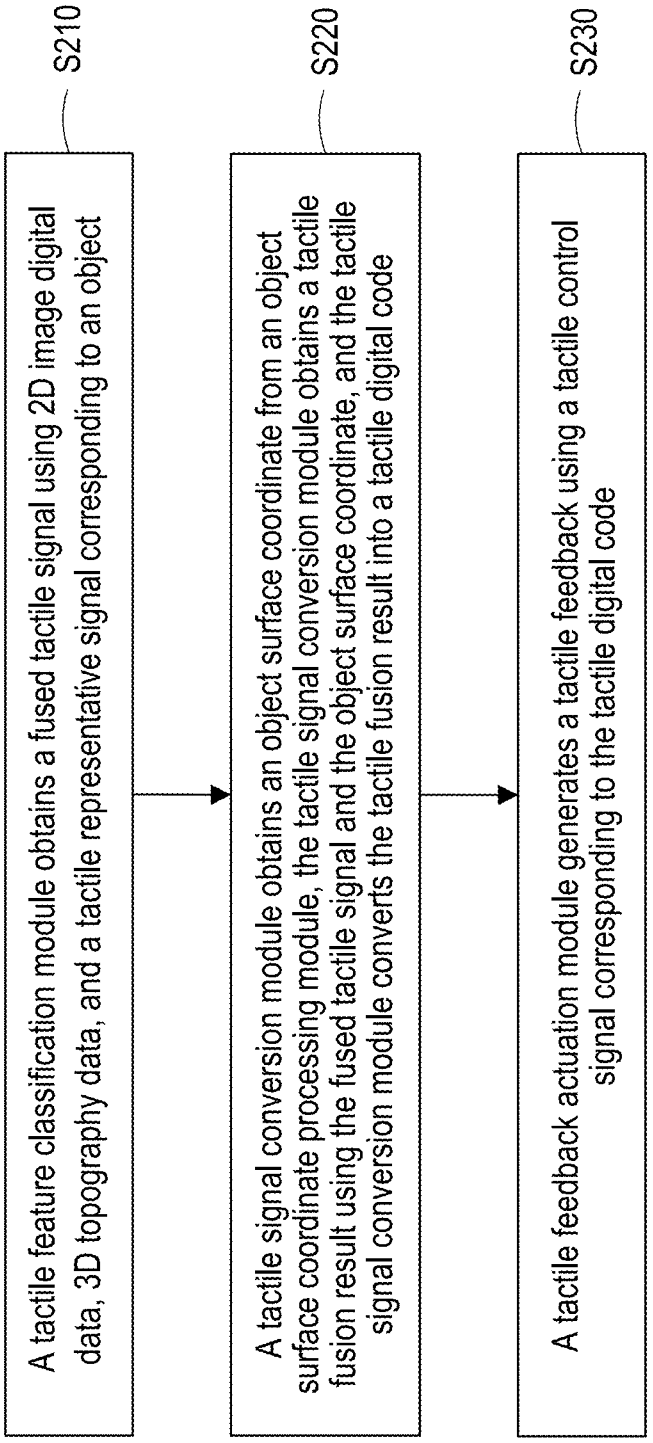
FIG. 2 is a flowchart of a method for generating a tactile feedback according to an embodiment of the disclosure.

FIG. 2 is a flowchart of a method for generating a tactile feedback according to an embodiment of the disclosure, wherein the method may be implemented by the tactile feedback system 1*a* shown in FIG. 1. Please refer to FIG. 1 and FIG. 2 at the same time.

In Step S210, the tactile feature classification module 20-1 may obtain a fused tactile signal using 2D image digital data, 3D topography data, and the tactile representative signal corresponding to an object. In an embodiment, the image sensing module 11 may obtain a touch object real-time image when the object is touched, and may obtain a pre-movement position and a post-movement position of the object, wherein the touch object real-time image may include an object surface texture. Then, the object surface coordinate processing module 20-3 may obtain an object surface coordinate using the pre-movement position and the post-movement position. On the other hand, the tactile imaging module 20-5 may execute a 2D image digital operation on the object surface texture to obtain the 2D image digital data. Based on this, the tactile imaging module 20-5 may obtain digital data with gray level contrast. In addition, the tactile imaging module 20-5 may obtain the 3D topography data using the touch object real-time image. The 3D topography data is, for example, a surface undulation feature of the object. Then, the tactile imaging module 20-5 may transmit the 2D image digital data and the 3D topography data to the tactile feature classification module 20-1. After the tactile feature classification module 20-1 receives the tactile representative signal from the tactile signal database 20-2, the tactile feature classification module 20-1 may obtain the fused tactile signal using the 2D image digital data, the 3D topography data, and the tactile representative signal. Then, the tactile feature classification module 20-1 may transmit the fused tactile signal to the tactile signal conversion module 20-4.

In Step S220, the tactile signal conversion module 20-4 may obtain the object surface coordinate from the object surface coordinate processing module 20-3, the tactile signal conversion module 20-4 may obtain a tactile fusion result using the fused tactile signal and the object surface coordinate, and the tactile signal conversion module 20-4 may convert the tactile fusion result into a tactile digital code.

In Step S230, the tactile feedback actuation module 31 may generate the tactile feedback using a tactile control signal corresponding to the tactile digital code. In an embodiment, the tactile feedback control subsystem 20 may include a tactile feedback modulation module 20-9. The tactile feedback modulation module 20-9 may convert the tactile digital code into the tactile control signal. Then, the tactile feedback actuation module 31 may generate the tactile feedback using the tactile control signal. In an embodiment, the tactile feedback modulation module 20-9 may include an electric friction control unit 20-9*a*, a deformation control unit 20-9*b*, and a vibration control unit 20-9*c*, wherein the tactile control signal may include an electric friction control signal (X % of the tactile control signal) corresponding to the electric friction control unit 20-9*a*, a deformation control signal (Y % of the tactile control signal) corresponding to the deformation control unit 20-9*b*, and a vibration control signal (Z % of the tactile control signal) corresponding to the vibration control unit 20-9*c*.

Figure 3A:
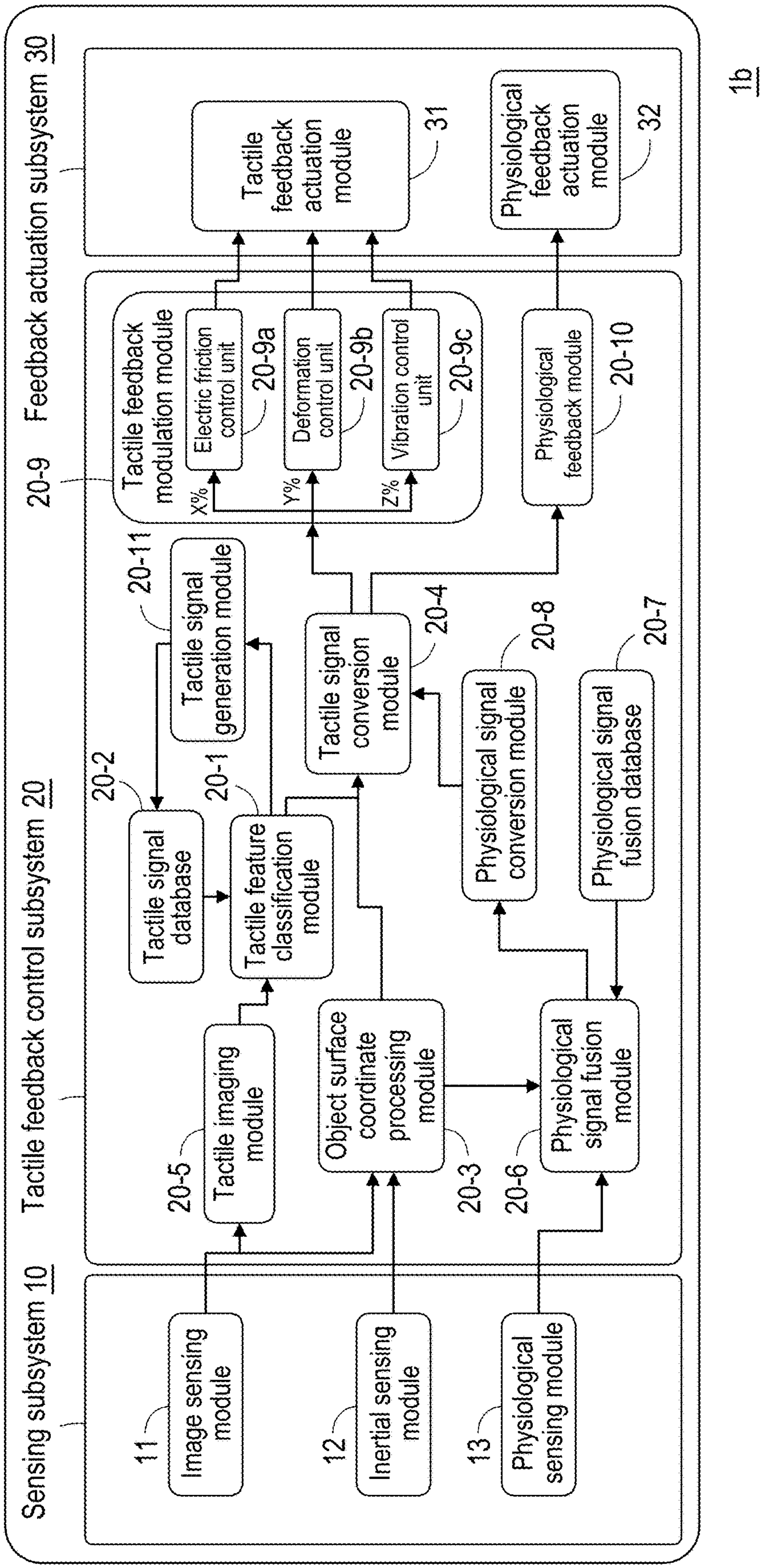
FIG. 3A is a schematic diagram of a tactile feedback system according to a second embodiment of the disclosure.

FIG. 3A is a schematic diagram of a tactile feedback system 1*b* according to a second embodiment of the disclosure. Please refer to FIG. 1 and FIG. 3A at the same time. The difference between the embodiments of FIG. 3A and FIG. 1 is that in the embodiment of FIG. 3A, the sensing subsystem 10 may include an inertial sensing module 12 and a physiological sensing module 13, the tactile feedback control subsystem 20 may include a physiological signal fusion module 20-6 and a physiological signal fusion database 20-7, and the physiological signal fusion database 20-7 may store a physiological variable representative signal. For example, the physiological variable representative signal is, for example, a parameter such as a surface temperature, a body temperature, an electromyographic signal, an electrocardiographic signal, an electroencephalographic signal, and a respiratory rate. The inertial sensing module 12 is, for example, an inertial measurement unit (IMU). On the other hand, the physiological sensing module 13 is, for example, a temperature sensor, a muscle strength sensor, a heart rate sensor, an electroencephalography sensor, or a respiration sensor. Furthermore, the tactile feedback control subsystem 20 may include a physiological signal conversion module 20-8, a physiological feedback module 20-10, and a tactile signal generation module 20-11, and the feedback actuation subsystem 30 may include a physiological feedback actuation module 32.

In the embodiment of FIG. 3A, the inertial sensing module 12 may obtain the pre-movement position and the post-movement position of the object, and the inertial sensing module 12 may obtain an instantaneous speed and an acceleration of the object using the pre-movement position and the post-movement position. Then, the inertial sensing module 12 may transmit the instantaneous speed and the acceleration to the object surface coordinate processing module 20-3. The object surface coordinate processing module 20-3 may obtain the object surface coordinate of the object using the pre-movement position, the post-movement position, instantaneous speed, and the acceleration.

On the other hand, in the embodiment of FIG. 3A, the physiological sensing module 13 may obtain a physiological signal value of the object. Then, the physiological signal fusion module 20-6 may obtain a fused physiological signal using the physiological signal value (received from the physiological sensing module 13), the object surface coordinate (received from the object surface coordinate processing module 20-3), and the physiological variable representative signal (received from the physiological signal fusion database 20-7). Then, the physiological signal conversion module 20-8 may convert the fused physiological signal into a physiological digital code. Then, the tactile signal conversion module 20-4 may obtain the tactile fusion result using the fused tactile signal, the object surface coordinate, and the physiological digital code. Furthermore, after the physiological feedback module 20-10 obtains the physiological digital code from the physiological signal conversion module 20-8, the physiological feedback module 20-10 may convert the physiological digital code into a physiological control signal. Then, the physiological feedback actuation module 32 may generate a physiological feedback using the physiological control signal.

It should be noted that in the embodiment of FIG. 3A, the tactile signal generation module 20-11 may generate the updated tactile representative signal using the fused tactile signal. Then, the tactile signal generation module 20-11 may store the updated tactile representative signal in the tactile signal database 20-2. In other words, if the fused tactile signal received by the tactile signal generation module 20-11 from the tactile feature classification module 20-1 is not stored in the tactile signal database 20-2 in advance, the tactile signal generation module 20-11 may generate the updated tactile representative signal, and store the updated tactile representative signal in the tactile signal database 20-2.

Figure 3B:
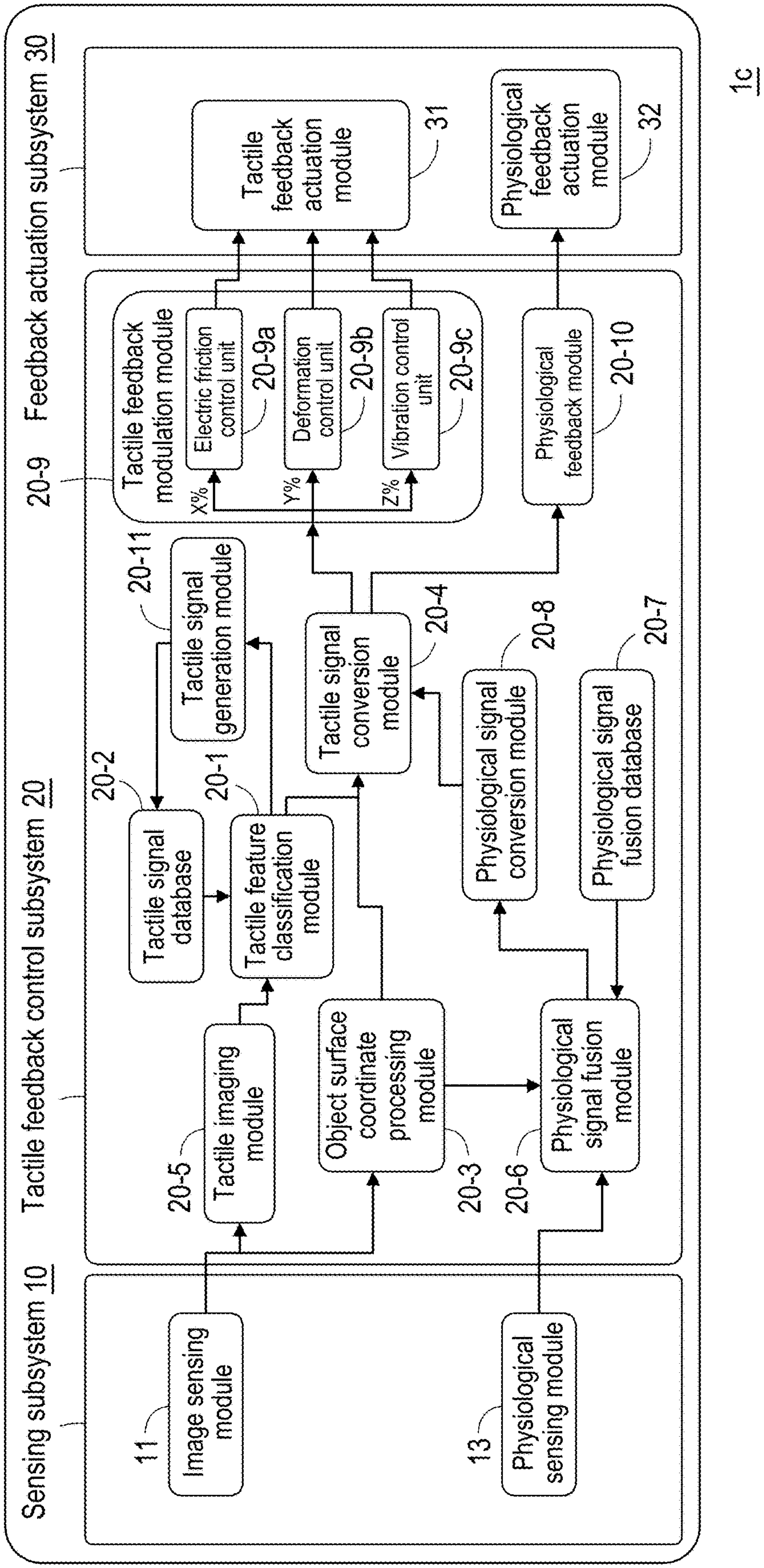
FIG. 3B is a schematic diagram of a tactile feedback system according to a third embodiment of the disclosure.

FIG. 3B is a schematic diagram of a tactile feedback system 1*c* according to a third embodiment of the disclosure. Please refer to FIG. 3B and FIG. 3A at the same time. The difference between the embodiments of FIG. 3B and FIG. 3A is that in the embodiment of FIG. 3B, the sensing subsystem 10 does not include the inertial sensing module 12.

Figure 3C:
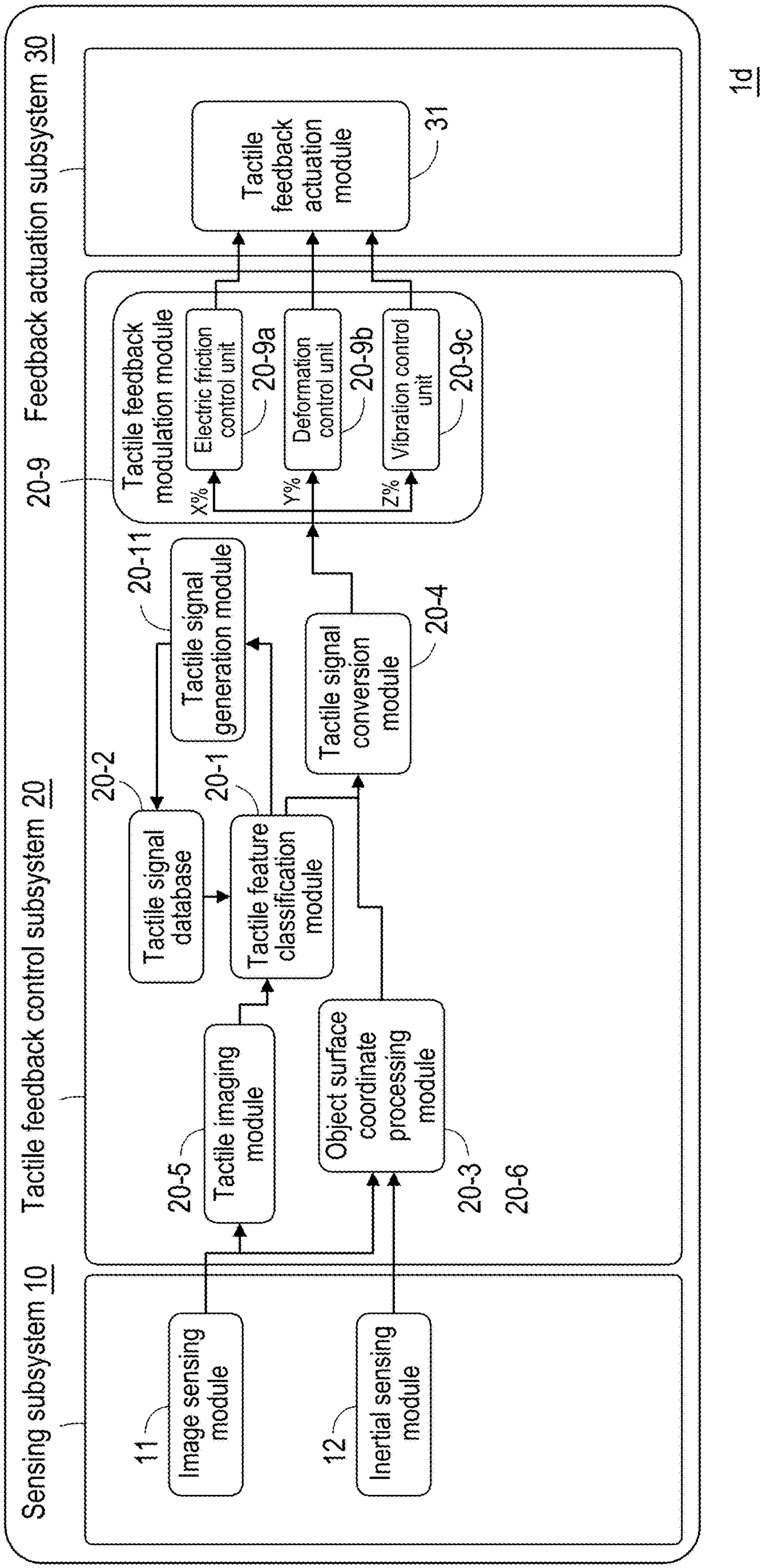
FIG. 3C is a schematic diagram of a tactile feedback system according to a fourth embodiment of the disclosure.

FIG. 3C is a schematic diagram of a tactile feedback system 1*d* according to a fourth embodiment of the disclosure. Please refer to FIG. 3C and FIG. 3A at the same time. The difference between the embodiments of FIG. 3C and FIG. 3A is that in the embodiment of FIG. 3C, the sensing subsystem 10 does not include the physiological sensing module 13, the tactile feedback control subsystem 20 does not include the physiological signal fusion module 20-6, the physiological signal fusion database 20-7, the physiological signal conversion module 20-8, and the physiological feedback module 20-10, and the feedback actuation subsystem 30 does not include the physiological feedback actuation module 32.

Figure 4A:
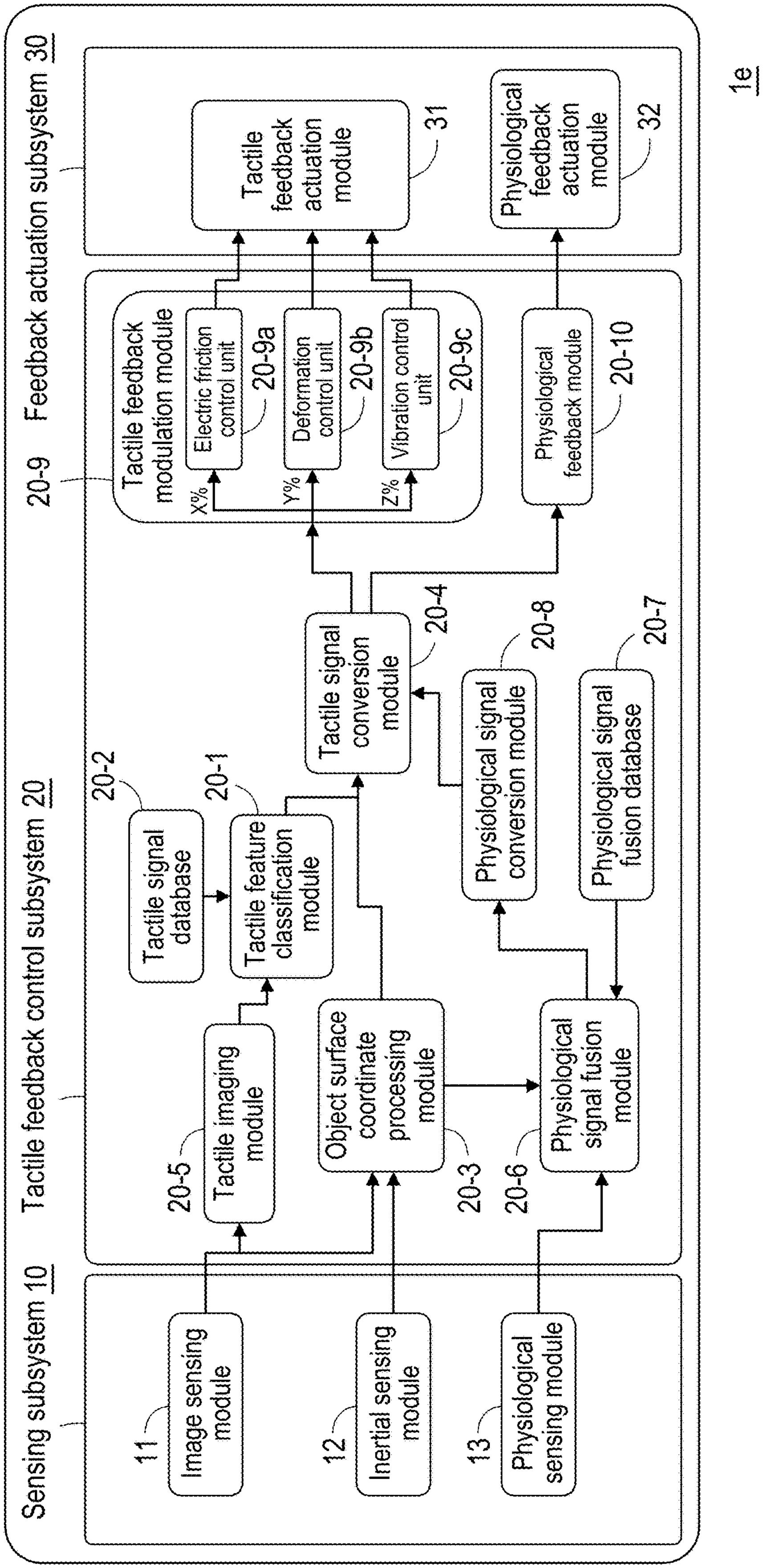
FIG. 4A is a schematic diagram of a tactile feedback system according to a fifth embodiment of the disclosure.

FIG. 4A is a schematic diagram of a tactile feedback system 1*e* according to a fifth embodiment of the disclosure. Please refer to FIG. 4A and FIG. 3A at the same time. The difference between the embodiments of FIG. 4A and FIG. 3A is that in the embodiment of FIG. 4A, the tactile feedback control subsystem 20 does not include the tactile signal generation module 20-11.

Figure 4B:
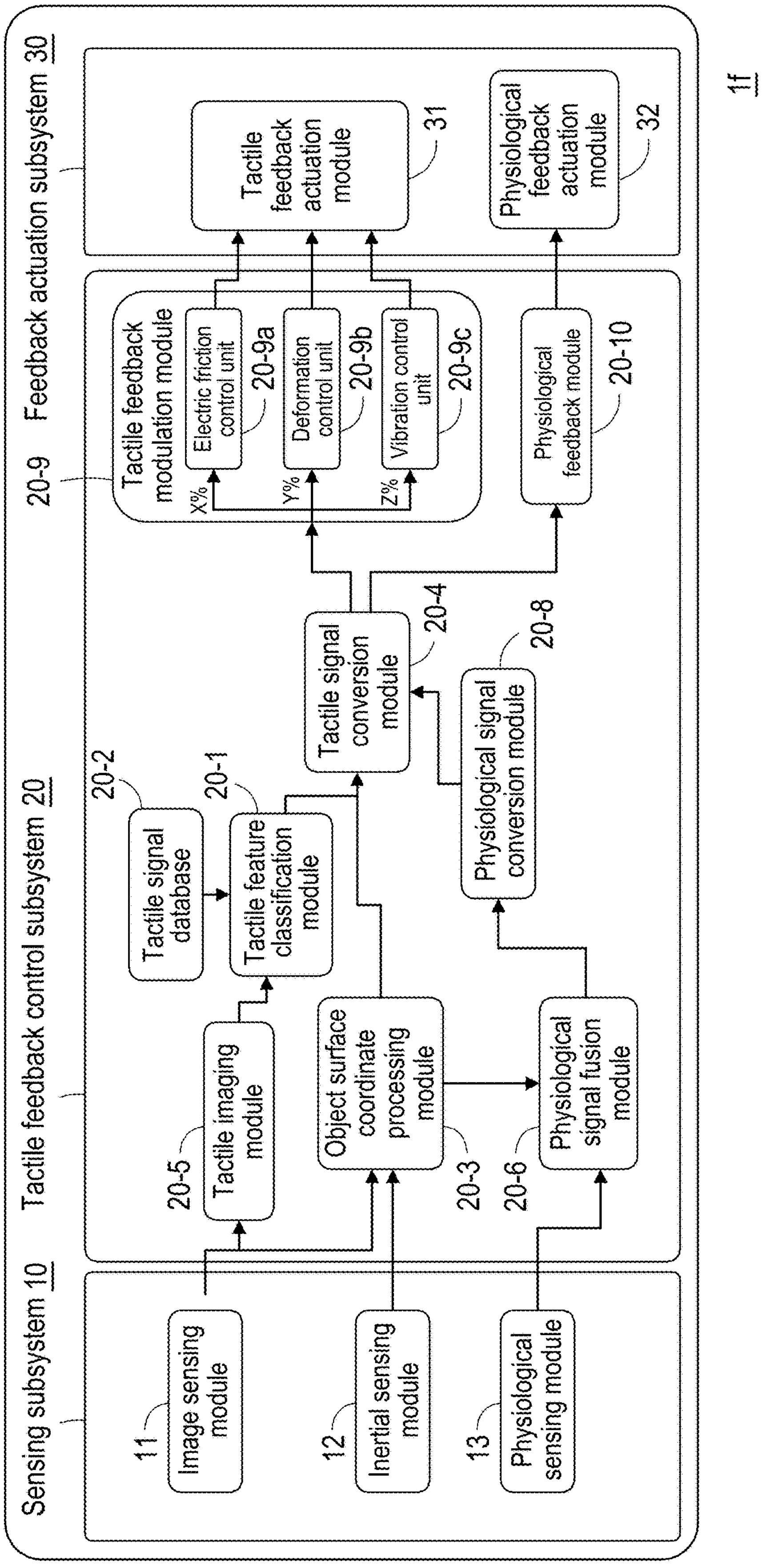
FIG. 4B is a schematic diagram of a tactile feedback system according to a sixth embodiment of the disclosure.

FIG. 4B is a schematic diagram of a tactile feedback system if according to a sixth embodiment of the disclosure. Please refer to FIG. 4B and FIG. 3A at the same time. The difference between the embodiments of FIG. 4B and FIG. 3A is that in the embodiment of FIG. 4B, the tactile feedback control subsystem 20 does not include the tactile signal generation module 20-11 and the physiological signal fusion database 20-7.

Figure 5A:
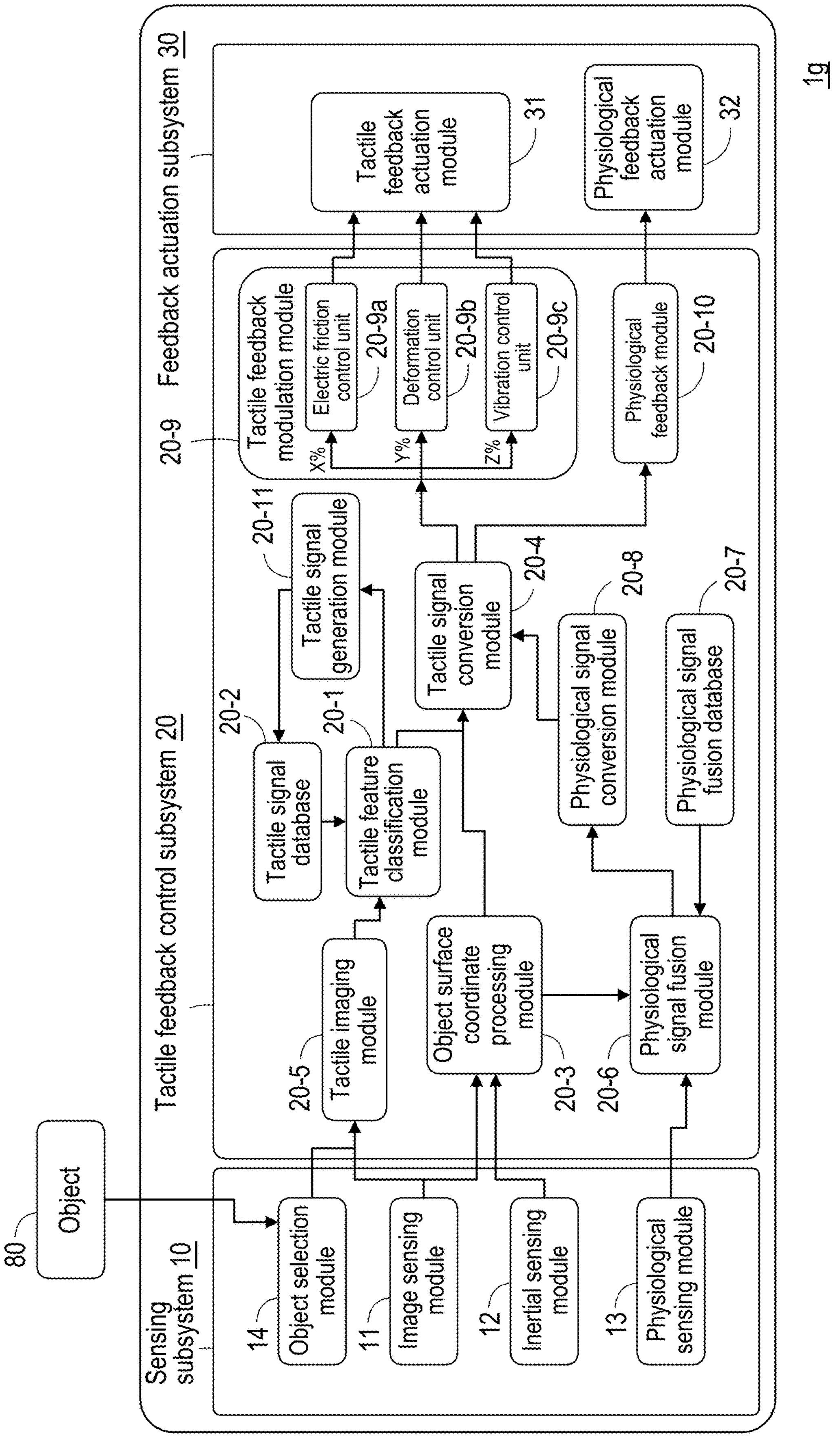
FIG. 5A is a schematic diagram of a tactile feedback system according to a seventh embodiment of the disclosure.

FIG. 5A is a schematic diagram of a tactile feedback system 1*g* according to a seventh embodiment of the disclosure. Please refer to FIG. 5A and FIG. 3A at the same time. The difference between the embodiments of FIG. 5A and FIG. 3A is that in the embodiment of FIG. 5A, the sensing subsystem 10 may include an object selection module 14. The object selection module 14 may judge whether an object 80 is touched. The object 80 is, for example, a virtual object. When the object selection module 14 judges that the object 80 is touched, the tactile feedback system 1*g* shown in FIG. 5A may execute the operation process of the tactile feedback system 1*b* shown in FIG. 3A.

Figure 5B:
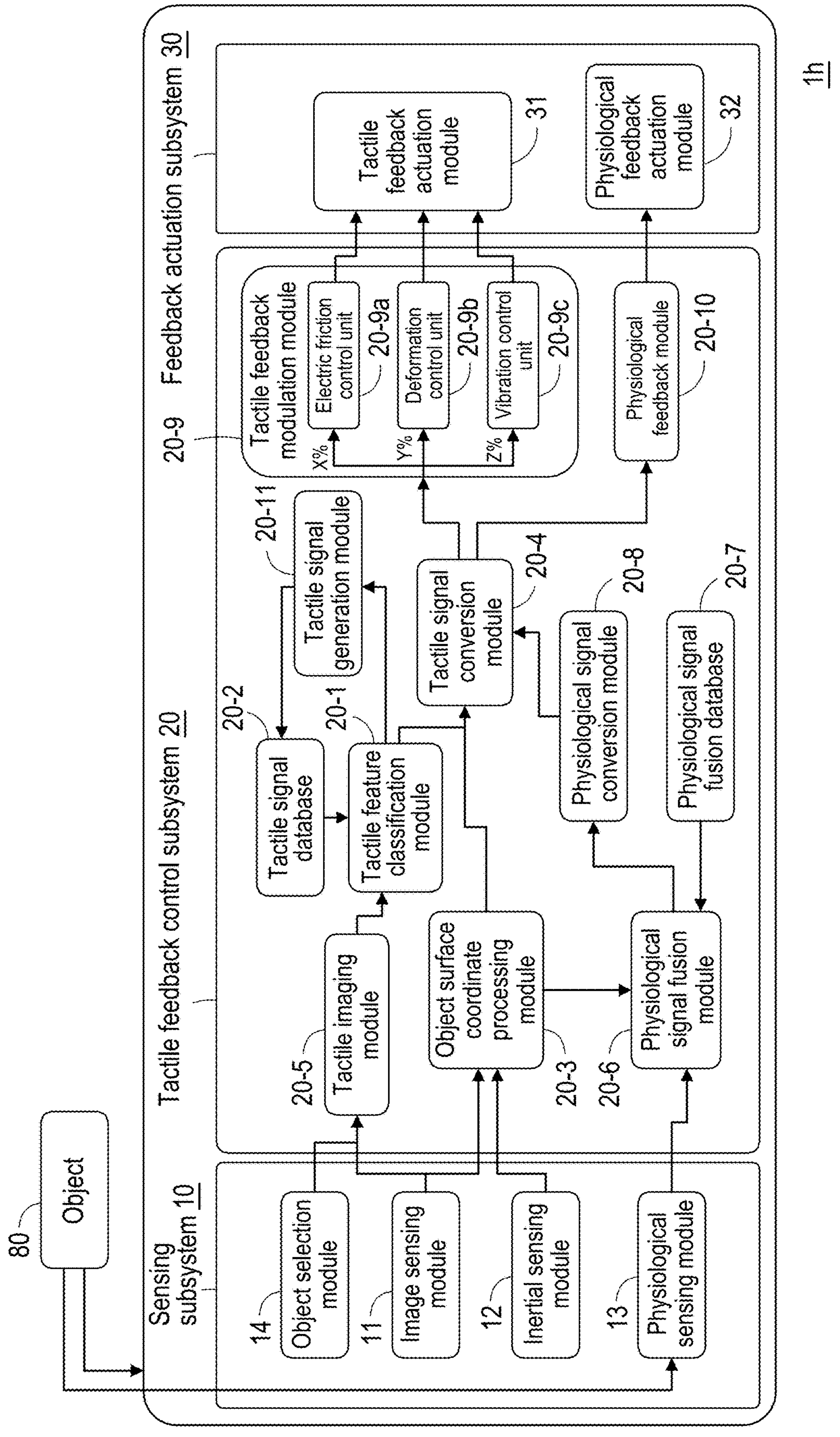
FIG. 5B is a schematic diagram of a tactile feedback system according to an eighth embodiment of the disclosure.

FIG. 5B is a schematic diagram of a tactile feedback system 1*h* according to an eighth embodiment of the disclosure. Please refer to FIG. 5B and FIG. 3A at the same time. The difference between the embodiments of FIG. 5B and FIG. 3A is that in the embodiment of FIG. 5B, the sensing subsystem 10 may include an object selection module 14. The object selection module 14 may judge whether an object 80 is touched. When the object selection module 14 judges that the object 80 is touched, the physiological sensing module 13 may receive a surface temperature of the object 80 from the object 80. Then, the tactile feedback system 1*h* shown in FIG. 5B may execute the operation process of the tactile feedback system 1*b* shown in FIG. 3A.

Figure 6A:
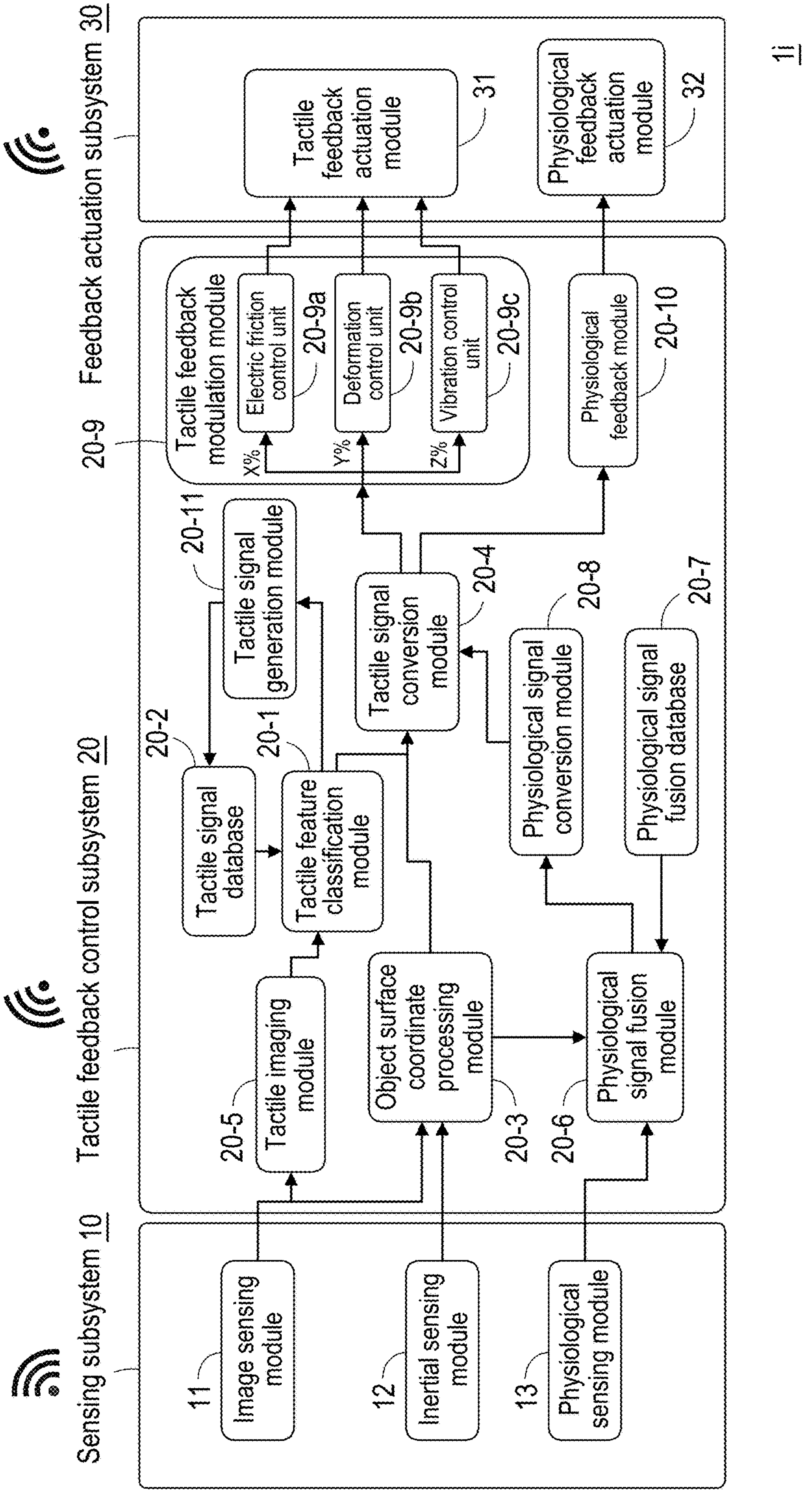
FIG. 6A is a schematic diagram of a tactile feedback system according to a ninth embodiment of the disclosure.

FIG. 6A is a schematic diagram of a tactile feedback system 1*i* according to a ninth embodiment of the disclosure. Please refer to FIG. 6A and FIG. 3A at the same time. The difference between the embodiments of FIG. 6A and FIG. 3A is that in the embodiment of FIG. 6A, the tactile feedback control subsystem 20 may be disposed in a cloud. On the other hand, the sensing subsystem 10 and the feedback actuation subsystem 30 may be disposed on the same local end. For example, the sensing subsystem 10 may be connected to the tactile feedback control subsystem 20 via a wireless network, and the tactile feedback control subsystem 20 may be connected to the feedback actuation subsystem 30 via a wireless network.

Figure 6B:
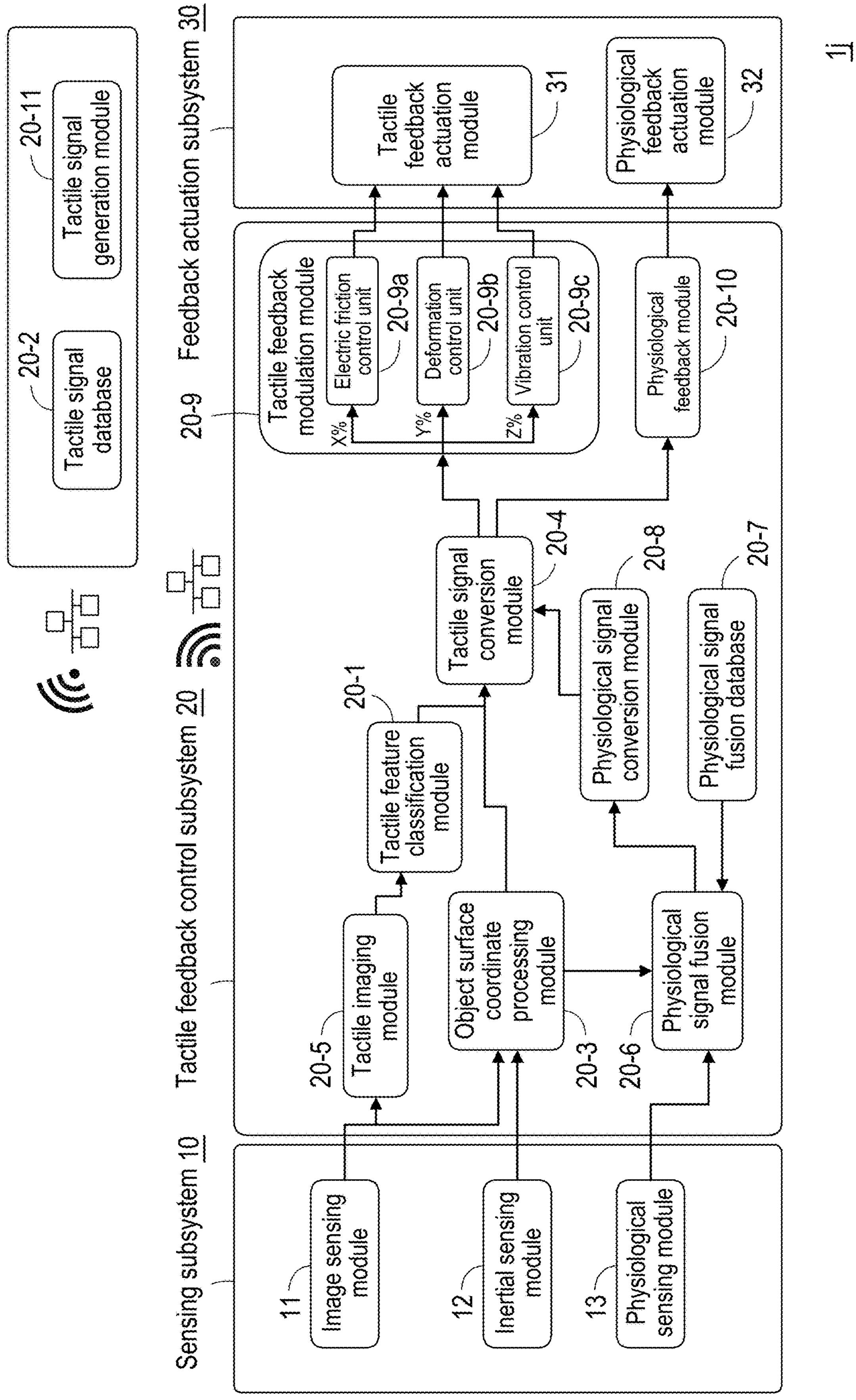
FIG. 6B is a schematic diagram of a tactile feedback system according to a tenth embodiment of the disclosure.

FIG. 6B is a schematic diagram of a tactile feedback system 1*j* according to a tenth embodiment of the disclosure. Please refer to FIG. 6B and FIG. 3A at the same time. The difference between the embodiments of FIG. 6B and FIG. 3A is that in the embodiment of FIG. 6B, the tactile signal database 20-2 and the tactile signal generation module 20-11 in the tactile feedback control subsystem 20 may be disposed in a cloud. On the other hand, other modules (except for the tactile signal database 20-2 and the tactile signal generation module 20-11) in the tactile feedback control subsystem 20, the sensing subsystem 10, and the feedback actuation subsystem 30 may be disposed on the same local end.

Figure 6C:
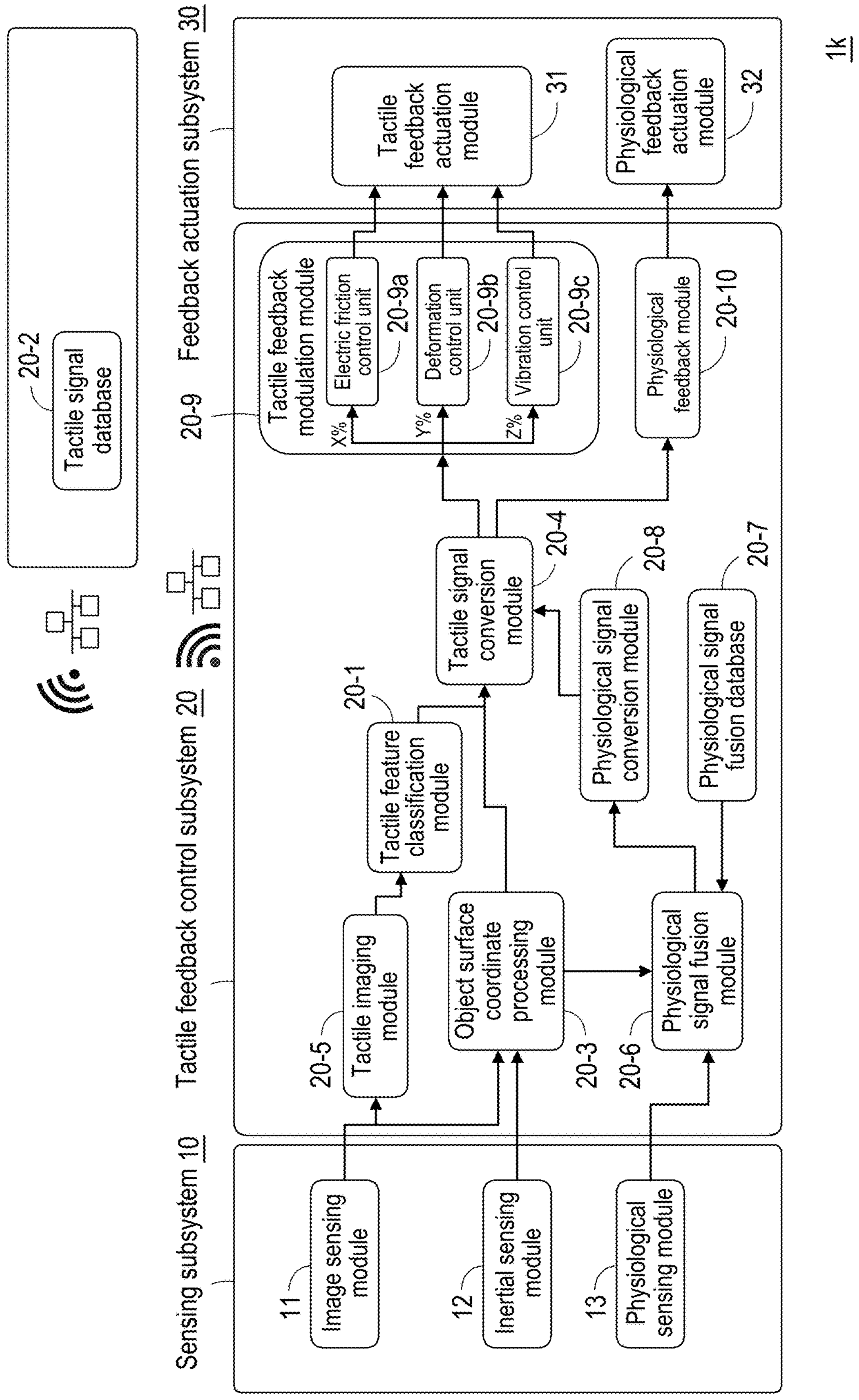
FIG. 6C is a schematic diagram of a tactile feedback system according to an eleventh embodiment of the disclosure.

FIG. 6C is a schematic diagram of a tactile feedback system 1*k* according to an eleventh embodiment of the disclosure. Please refer to FIG. 6C and FIG. 4A at the same time. The difference between the embodiments of FIG. 6C and FIG. 4A is that in the embodiment of FIG. 6C, the tactile signal database 20-2 in the tactile feedback control subsystem 20 may be disposed in a cloud. On the other hand, other modules (except for the tactile signal database 20-2) in the tactile feedback control subsystem 20, the sensing subsystem 10, and the feedback actuation subsystem 30 may be disposed on the same local end.

The following will describe implementation examples of the tactile imaging module 20-5, the tactile feature classification module 20-1, the tactile signal conversion module 20-4, and the tactile feedback modulation module 20-9 in the tactile feedback control subsystem 20 of the disclosure.

In an embodiment, the tactile imaging module 20-5 may execute a shadow removal operation on the touch object real-time image when the object is touched to obtain a shadow-removed touch object real-time image, and a gray level co-occurrence matrix (GLCM) may be generated using the shadow-removed touch object real-time image, wherein the gray level co-occurrence matrix may include multiple elements. Then, the tactile imaging module 20-5 may calculate a gray level value of each of the elements, and may calculate an eigenvalue of each of the elements using the gray level value, wherein the eigenvalue may include an energy value, an entropy value, a contrast value, a correlation value, and a contrast score. The gray level values may be classified into 256 levels (levels 0 to 255). For example, it is assumed that $C_{ij}$ represents the gray level value of the element in the i-th row and the j-th column in the gray level co-occurrence matrix. A calculation formula of the energy value may be $\Sigma_i\Sigma_j^{C_{ij}^2}$, a calculation formula of the entropy value may be $-\Sigma_i\Sigma_j^{C_{ij}log\ C_{ij}}$, a calculation formula of the contrast value may be $\Sigma_i\Sigma_j^{(i-j)^2 c_{ij}}$, a calculation formula of the correlation value may be $$\sum_i\sum_j \frac{(i*j)C_{ij}-(\mu_x*\mu_y)}{\sigma_x\sigma_y},$$

and a calculation formula of the contrast score may be $$\sum_i\sum_j \frac{1}{1+(i-j)^2}C_{ij}.$$

Then, the tactile imaging module 20-5 may use the gray level co-occurrence matrix at various angles, such as 0 degrees, 45 degrees, 90 degrees, and 135 degrees.

Then, the tactile feature classification module 20-1 may calculate a gray level proportion, a gray level value change topography, and a gray level gradient change corresponding to the touch object real-time image using a finger pulp contact area, and may judge an interactive relationship and a degree of smoothness of the object. Furthermore, the tactile feature classification module 20-1 may judge whether a contact surface of the object is an edge structure using a contact area gray level value corresponding to the finger pulp contact area.

Figure 7A:
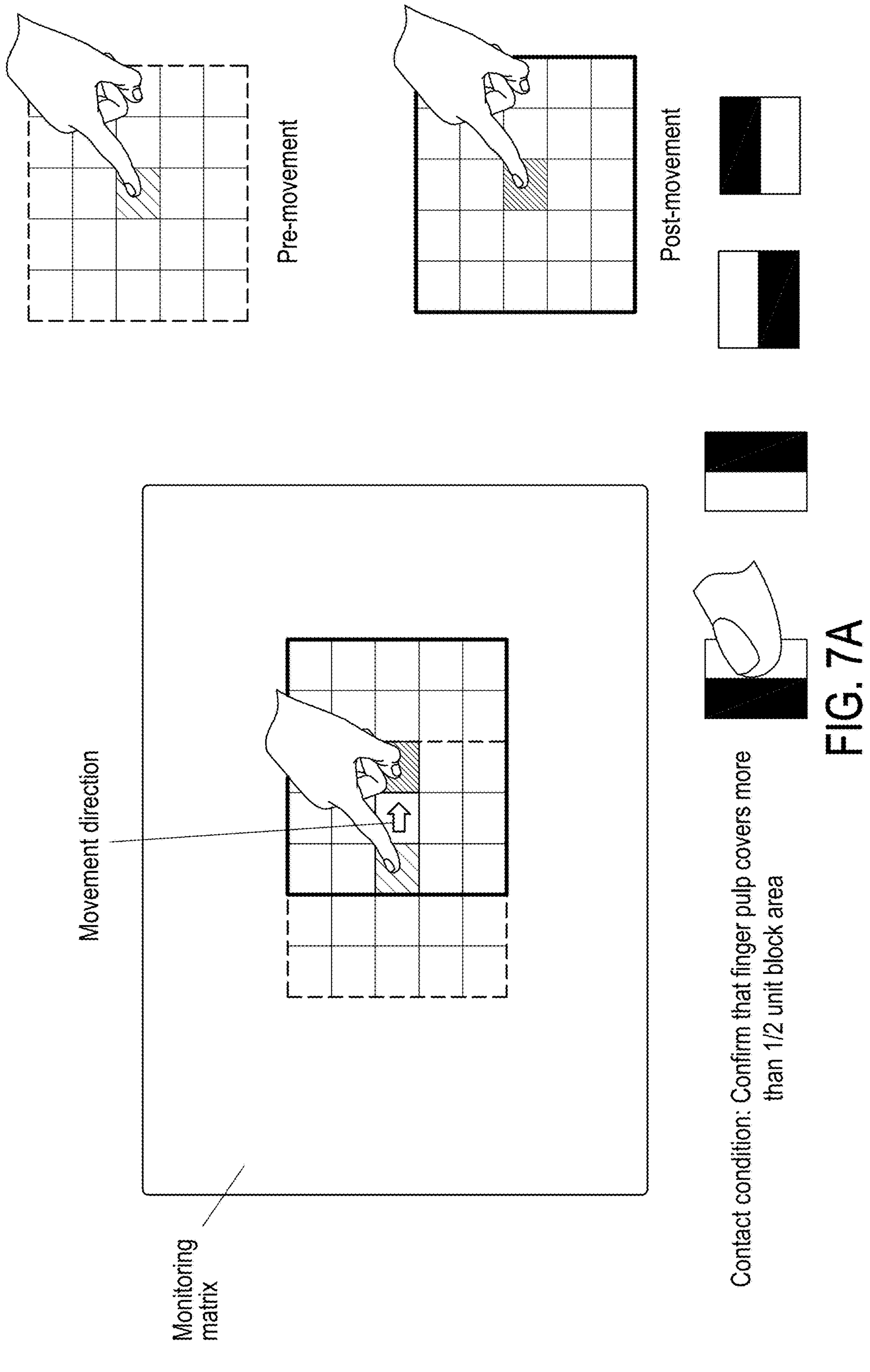
FIG. 7A is a schematic diagram of a tactile feature classification module judging whether a finger is stationary or moving according to an embodiment of the disclosure.
Figure 7B:
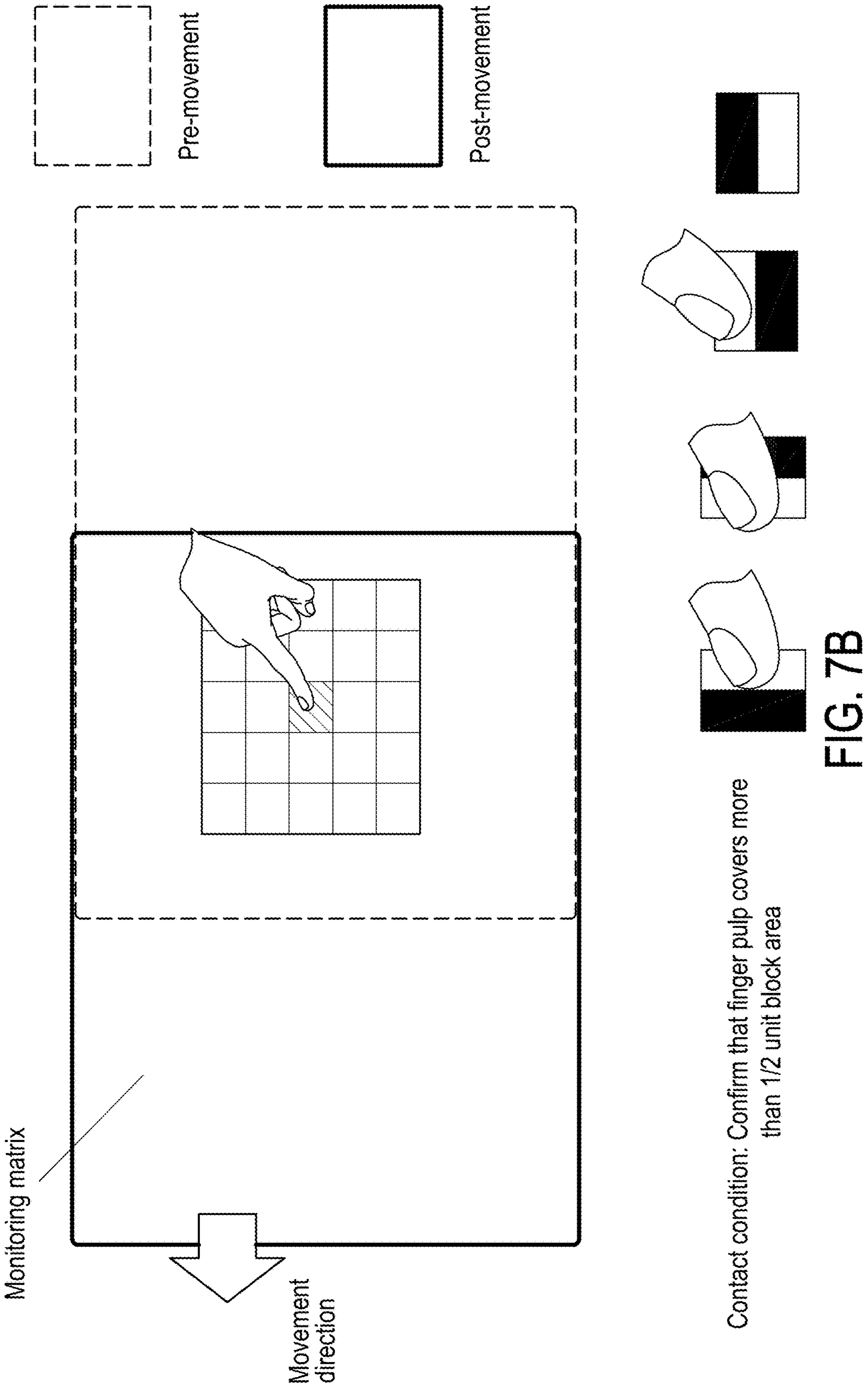
FIG. 7B is a schematic diagram of the tactile feature classification module judging whether an object is stationary or moving according to an embodiment of the disclosure.

FIG. 7A is a schematic diagram of the tactile feature classification module 20-1 judging whether the finger is stationary or moving according to an embodiment of the disclosure. FIG. 7B is a schematic diagram of the tactile feature classification module 20-1 judging whether the object is stationary or moving according to an embodiment of the disclosure. Please refer to FIG. 1, FIG. 7A, and FIG. 7B at the same time. The tactile feature classification module 20-1 may adopt a monitoring matrix, and define a pulp contact area size representing one finger as the central position. Then, the tactile feature classification module 20-1 may calculate the gray level proportion (to judge a texture form), the gray level value change topography, and the gray level gradient change, and may judge the interactive relationship between the finger and the object or may judge the degree of smoothness of the object. On the other hand, the tactile feature classification module 20-1 may judge whether the contact surface is the edge structure using the contact area gray level value of one-half of a finger pulp area in the touch object real-time image.

Furthermore, the tactile feature classification module 20-1 may classify tactile features into multiple categories, wherein the categories may include roughness features, smoothness features, soft/hard elasticity features, viscosity features, and temperature features. Furthermore, each category may be further divided into 3 levels. Specifically, the roughness features are, for example, to distinguish between textures or particle sizes of surfaces of objects. The smoothness features are, for example, to distinguish between degrees of smoothness of surfaces of objects. The soft/hard elasticity features are, for example, to distinguish between different degrees of hardness, softness, elasticity, etc. of surfaces of objects. The viscosity features are, for example, to distinguish between degrees of viscosity of surfaces of objects. The temperature features are, for example, to distinguish between cold (less than 20 °C), warm (20 °C to 50 °C), and hot (greater than 50 °C) of surfaces of objects. Then, the tactile feature classification module 20-1 may add the viscosity features and the temperature features to the gray level co-occurrence matrix to obtain the fused tactile signal. In other words, the general gray level co-occurrence matrix is usually only used for gray value processing of images, while the tactile feature classification module 20-1 of the disclosure may add the viscosity features and the temperature features to the gray level co-occurrence matrix to obtain the fused tactile signal.

After the tactile feature classification module 20-1 obtains the fused tactile signal, the tactile signal conversion module 20-4 may obtain the tactile fusion result using the fused tactile signal and the object surface coordinate, and the tactile signal conversion module 20-4 may convert the tactile fusion result into the tactile digital code. Then, the tactile feedback modulation module 20-9 may convert the tactile digital code into the tactile control signal.

Figure 8:
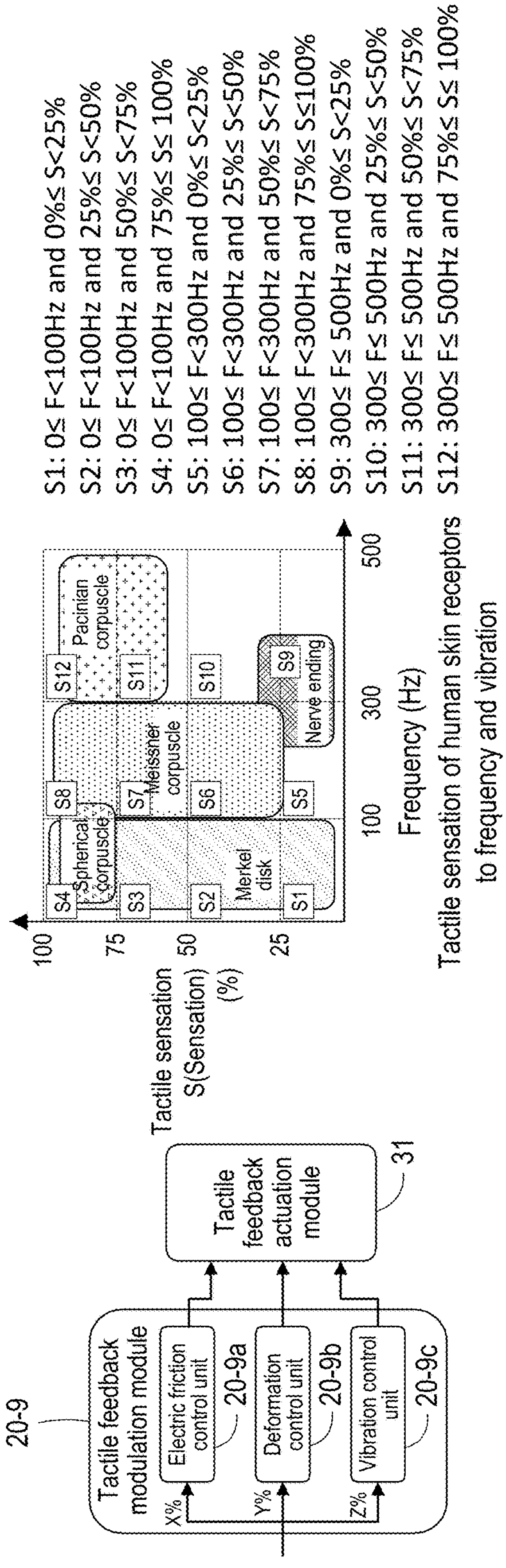
FIG. 8 is a schematic diagram of a tactile feedback modulation module converting a tactile digital code into a tactile control signal according to an embodiment of the disclosure.

FIG. 8 is a schematic diagram of the tactile feedback modulation module 20-9 converting the tactile digital code into the tactile control signal according to an embodiment of the disclosure. Please refer to FIG. 1 and FIG. 8 at the same time. In the embodiment, the tactile control signal may be associated with frequency and tactile sensation. Specifically, the tactile feedback modulation module 20-9 may divide the frequency into different intervals using 100 Hz, 300 Hz, and 500 Hz, and may divide the tactile sensation into different intervals using 25%, 50%, 75%, and 100%. Then, the tactile feedback modulation module 20-9 may obtain 12 types of the tactile control signal such as S1 to S12 as shown in FIG. 8. The tactile control signal may include the electric friction control signal (X % of the tactile control signal) corresponding to the electric friction control unit 20-9*a*, the deformation control signal (Y % of the tactile control signal) corresponding to the deformation control unit 20-9*b*, and the vibration control signal (Z % of the tactile control signal) corresponding to the vibration control unit 20-9*c*. Specifically, the respective ranges of X %, Y %, and Z % above may respectively be 0% to 100%. Then, the tactile feedback actuation module 31 may generate the tactile feedback using the tactile control signal.

In summary, the tactile feedback system and the method for generating the tactile feedback of the embodiments of the disclosure may obtain the tactile fusion result using the fused tactile signal and the object surface coordinate to convert the tactile digital code, and generate the tactile feedback using the tactile control signal. In particular, the tactile control signal of the embodiment of the disclosure may include the electric friction control signal, the deformation control signal, and the vibration control signal. Therefore, the tactile feedback system and the method for generating the tactile feedback of the embodiments of the disclosure can provide an effective/highly realistic tactile feedback.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A tactile feedback system, comprising:

a tactile feedback control device, comprising a tactile feature classification processor, a tactile signal database, an object surface coordinate processing processor, and a tactile signal conversion processor, wherein the tactile signal database stores a tactile representative signal; and a feedback actuation device, comprising a tactile feedback actuation processor, wherein the tactile feature classification processor obtains a fused tactile signal using 2D image digital data, 3D topography data, and the tactile representative signal corresponding to an object;

the tactile signal conversion processor obtains an object surface coordinate from the object surface coordinate processing processor, the tactile signal conversion processor obtains a tactile fusion result using the fused tactile signal and the object surface coordinate, and the tactile signal conversion processor converts the tactile fusion result into a tactile digital code; and the tactile feedback actuation processor generates a tactile feedback using a tactile control signal corresponding to the tactile digital code, wherein the tactile feedback system further comprises a sensing device, wherein the sensing device comprises an image sensing processor, wherein the tactile feedback control device further comprises a tactile imaging processor, wherein:

the image sensing processor obtains a touch object real-time image when the object is touched, and obtains a pre-movement position and a post-movement position of the object, wherein the touch object real-time image comprises an object surface texture;

the object surface coordinate processing processor obtains the object surface coordinate using the pre-movement position and the post-movement position;

the tactile imaging processor executes a 2D image digital operation on the object surface texture to obtain the 2D image digital data;

the tactile imaging processor obtains the 3D topography data using the touch object real-time image; and the tactile imaging processor transmits the 2D image digital data and the 3D topography data to the tactile feature classification processor, wherein the sensing device further comprises an inertial sensing processor, wherein:

the inertial sensing processor obtains the pre-movement position and the post-movement position of the object, and the inertial sensing processor obtains an instantaneous speed and an acceleration of the object using the pre-movement position and the post-movement position;

the inertial sensing processor transmits the instantaneous speed and the acceleration to the object surface coordinate processing processor; and the object surface coordinate processing processor obtains the object surface coordinate of the object using the pre-movement position, the post-movement position, the instantaneous speed, and the acceleration.

2. The tactile feedback system according to claim 1, wherein the tactile feedback control device further comprises a tactile feedback modulation processor, wherein the tactile feedback modulation processor converts the tactile digital code into the tactile control signal.

3. The tactile feedback system according to claim 2, wherein the tactile feedback modulation processor comprises an electric friction control unit, a deformation control unit, and a vibration control unit, wherein the tactile control signal comprises an electric friction control signal corresponding to the electric friction control unit, a deformation control signal corresponding to the deformation control unit, and a vibration control signal corresponding to the vibration control unit, wherein the tactile control signal is associated with frequency and tactile sensation.

4. The tactile feedback system according to claim 1, wherein the sensing device further comprises a physiological sensing processor, wherein the tactile feedback control device further comprises a physiological signal fusion processor and a physiological signal fusion database, and the physiological signal fusion database stores a physiological variable representative signal, wherein:

the physiological sensing processor obtains a physiological signal value of the object; and the physiological signal fusion processor obtains a fused physiological signal using the physiological signal value, the object surface coordinate, and the physiological variable representative signal.

5. The tactile feedback system according to claim 4, wherein the sensing device further comprises an object selection processor, wherein:

the object selection processor judges whether the object is touched; and when the object selection processor judges that the object is touched, the physiological sensing processor receives a surface temperature of the object from the object.

6. The tactile feedback system according to claim 4, wherein the tactile feedback control device further comprises a physiological signal conversion processor, a tactile feedback modulation processor, and a physiological feedback processor, wherein the feedback actuation device further comprises a physiological feedback actuation processor, wherein:

the physiological signal conversion processor converts the fused physiological signal into a physiological digital code;

the tactile signal conversion processor obtains the tactile fusion result using the fused tactile signal, the object surface coordinate, and the physiological digital code;

the tactile feedback modulation processor converts the tactile digital code into the tactile control signal;

the physiological feedback processor converts the physiological digital code into the physiological control signal; and the physiological feedback actuation processor generates a physiological feedback using the physiological control signal.

7. The tactile feedback system according to claim 1, wherein the tactile feedback control device further comprises a tactile signal generation processor, wherein:

the tactile signal generation processor generates the updated tactile representative signal using the fused tactile signal;

the tactile signal generation processor stores the updated tactile representative signal in the tactile signal database.

8. The tactile feedback system according to claim 1, wherein the tactile feedback control device further comprises a tactile imaging processor, wherein:

the tactile imaging processor executes a shadow removal operation on a touch object real-time image when the object is touched to obtain the shadow-removed touch object real-time image, and generates a gray level co-occurrence matrix using the shadow-removed touch object real-time image, wherein the gray level co-occurrence matrix comprises a plurality of elements; and the tactile imaging processor calculates a gray level value of each of the elements, and calculates an eigenvalue of each of the elements using the gray level value, wherein the eigenvalue comprises an energy value, an entropy value, a contrast value, a correlation value, and a contrast score.

9. The tactile feedback system according to claim 8, wherein:

the tactile feature classification processor calculates a gray level proportion, a gray level value change topography, and a gray level gradient change corresponding to the touch object real-time image using a finger pulp contact area, and judges an interactive relationship and a degree of smoothness of the object;

the tactile feature classification processor judges whether a contact surface of the object is an edge structure using a contact area gray level value corresponding to the finger pulp contact area;

the tactile feature classification processor classifies tactile features into a plurality of categories, wherein the categories comprise roughness features, smoothness features, soft/hard elasticity features, viscosity features, and temperature features; and the tactile feature classification processor adds the viscosity features and the temperature features to the gray level co-occurrence matrix to obtain the fused tactile signal.

10. A method for generating a tactile feedback, applicable to a tactile feedback system comprising a tactile feedback control device and a feedback actuation device, wherein the tactile feedback control device comprises a tactile feature classification processor, a tactile signal database, an object surface coordinate processing processor, and a tactile signal conversion processor, wherein the tactile signal database stores a tactile representative signal, wherein the feedback actuation device comprises a tactile feedback actuation processor, the method comprising:

obtaining, by the tactile feature classification processor, a fused tactile signal using 2D image digital data, 3D topography data, and the tactile representative signal corresponding to an object;

obtaining, by the tactile signal conversion processor, an object surface coordinate from the object surface coordinate processing processor, obtaining, by the tactile signal conversion processor, a tactile fusion result using the fused tactile signal and the object surface coordinate, and converting, by the tactile signal conversion processor, the tactile fusion result into a tactile digital code; and generating, by the tactile feedback actuation processor, the tactile feedback using a tactile control signal corresponding to the tactile digital code, wherein the tactile feedback system further comprises a sensing device, wherein the sensing device comprises an image sensing processor, wherein the tactile feedback control device further comprises a tactile imaging processor, the method further comprising:

obtaining, by the image sensing processor, a touch object real-time image when the object is touched, and obtaining a pre-movement position and a post-movement position of the object, wherein the touch object real-time image comprises an object surface texture;

obtaining, by the object surface coordinate processing processor, the object surface coordinate using the pre-movement position and the post-movement position;

executing, by the tactile imaging processor, a 2D image digital operation on the object surface texture to obtain the 2D image digital data;

obtaining, by the tactile imaging processor, the 3D topography data using the touch object real-time image; and transmitting, by the tactile imaging processor, the 2D image digital data and the 3D topography data to the tactile feature classification processor, wherein the sensing device further comprises an inertial sensing processor, the method further comprising:

obtaining, by the inertial sensing processor, the pre-movement position and the post-movement position of the object, and obtaining, by the inertial sensing processor, an instantaneous speed and an acceleration of the object using the pre-movement position and the post-movement position;

transmitting, by the inertial sensing processor, the instantaneous speed and the acceleration to the object surface coordinate processing processor;

obtaining, by the object surface coordinate processing processor, the object surface coordinate of the object using the pre-movement position, the post-movement position, the instantaneous speed, and the acceleration.

11. The method according to claim 10, wherein the sensing device further comprises a physiological sensing processor, wherein the tactile feedback control device further comprises a physiological signal fusion processor and a physiological signal fusion database, and the physiological signal fusion database stores a physiological variable representative signal, the method further comprising:

obtaining, by the physiological sensing processor, a physiological signal value of the object; and obtaining, by the physiological signal fusion processor, a fused physiological signal using the physiological signal value, the object surface coordinate, and the physiological variable representative signal.

12. The method according to claim 11, wherein the sensing device further comprises an object selection processor, the method further comprising:

judging, by the object selection processor, whether the object is touched; and receiving, by the physiological sensing processor, a surface temperature of the object from the object when the object selection processor judges that the object is touched.

13. The method according to claim 11, wherein the tactile feedback control device further comprises a physiological signal conversion processor, a tactile feedback modulation processor, and a physiological feedback processor, wherein the feedback actuation device further comprises a physiological feedback actuation processor, the method further comprising:

converting, by the physiological signal conversion processor, the fused physiological signal into a physiological digital code;

obtaining, by the tactile signal conversion processor, the tactile fusion result using the fused tactile signal, the object surface coordinate, and the physiological digital code;

converting, by the tactile feedback modulation processor, the tactile digital code into the tactile control signal;

converting, by the physiological feedback processor, the physiological digital code into the physiological control signal; and generating, by the physiological feedback actuation processor, a physiological feedback using the physiological control signal.

14. The method according to claim 10, wherein the tactile feedback modulation processor comprises an electric friction control unit, a deformation control unit, and a vibration control unit, wherein the tactile control signal comprises an electric friction control signal corresponding to the electric friction control unit, a deformation control signal corresponding to the deformation control unit, and a vibration control signal corresponding to the vibration control unit, wherein the tactile control signal is associated with frequency and tactile sensation.

15. The method according to claim 10, wherein the tactile feedback control device further comprises a tactile signal generation processor, the method further comprising:

generating, by the tactile signal generation processor, the updated tactile representative signal using the fused tactile signal; and storing, by the tactile signal generation processor, the updated tactile representative signal in the tactile signal database.

16. The method according to claim 10, wherein the tactile feedback control device further comprises a tactile imaging processor, the method further comprising:

executing, by the tactile imaging processor, a shadow removal operation on a touch object real-time image when the object is touched to obtain the shadow-removed touch object real-time image, and generating a gray level co-occurrence matrix using the shadow-removed touch object real-time image, wherein the gray level co-occurrence matrix comprises a plurality of elements; and calculating, by the tactile imaging processor, a gray level value of each of the elements, and calculating an eigenvalue of each of the elements using the gray level value, wherein the eigenvalue comprises an energy value, an entropy value, a contrast value, a correlation value, and a contrast score.

17. The method according to claim 16, wherein the tactile feedback control device further comprises a tactile imaging processor, the method further comprising:

calculating, by the tactile feature classification processor, a gray level proportion, a gray level value change topography, and a gray level gradient change corresponding to the touch object real-time image using a finger pulp contact area, and judging an interactive relationship and a degree of smoothness of the object;

judging, by the tactile feature classification processor, whether a contact surface of the object is an edge structure using a contact area gray level value corresponding to the finger pulp contact area;

classifying, by the tactile feature classification processor, tactile features into a plurality of categories, wherein the categories comprise roughness features, smoothness features, soft/hard elasticity features, viscosity features, and temperature features; and adding, by the tactile feature classification processor, the viscosity features and the temperature features to the gray level co-occurrence matrix to obtain the fused tactile signal.

* * * * *